Oct. 3, 1939.   C. A. MATSON   2,175,061
NO-ROLL-BACK DEVICE
Filed April 13, 1929   2 Sheets-Sheet 1
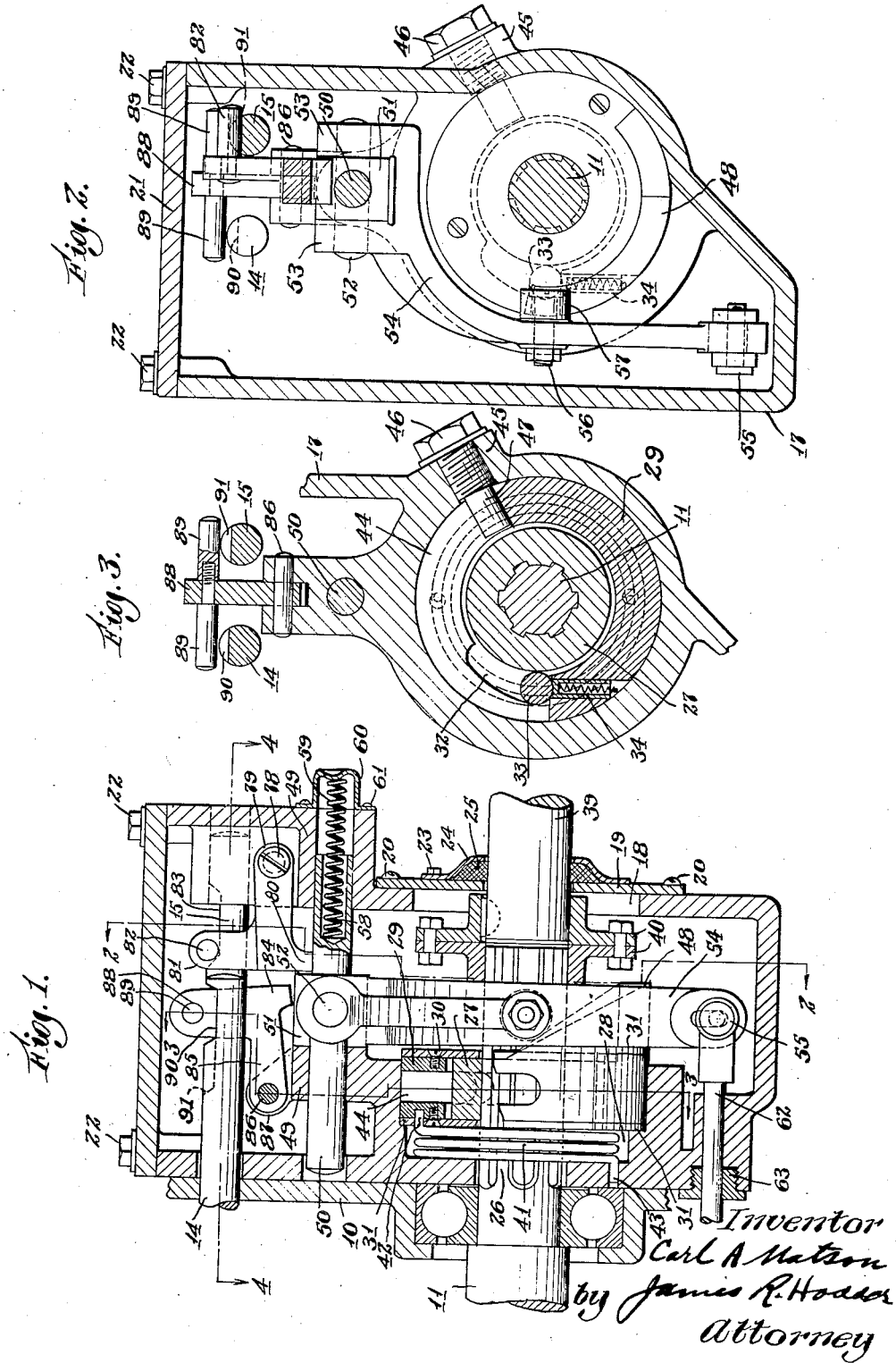
Inventor
Carl A Matson
by James R. Hodder
Attorney Oct. 3, 1939. C. A. MATSON 2,175,061
NO-ROLL-BACK DEVICE
Filed April 13, 1929 2 Sheets-Sheet 2
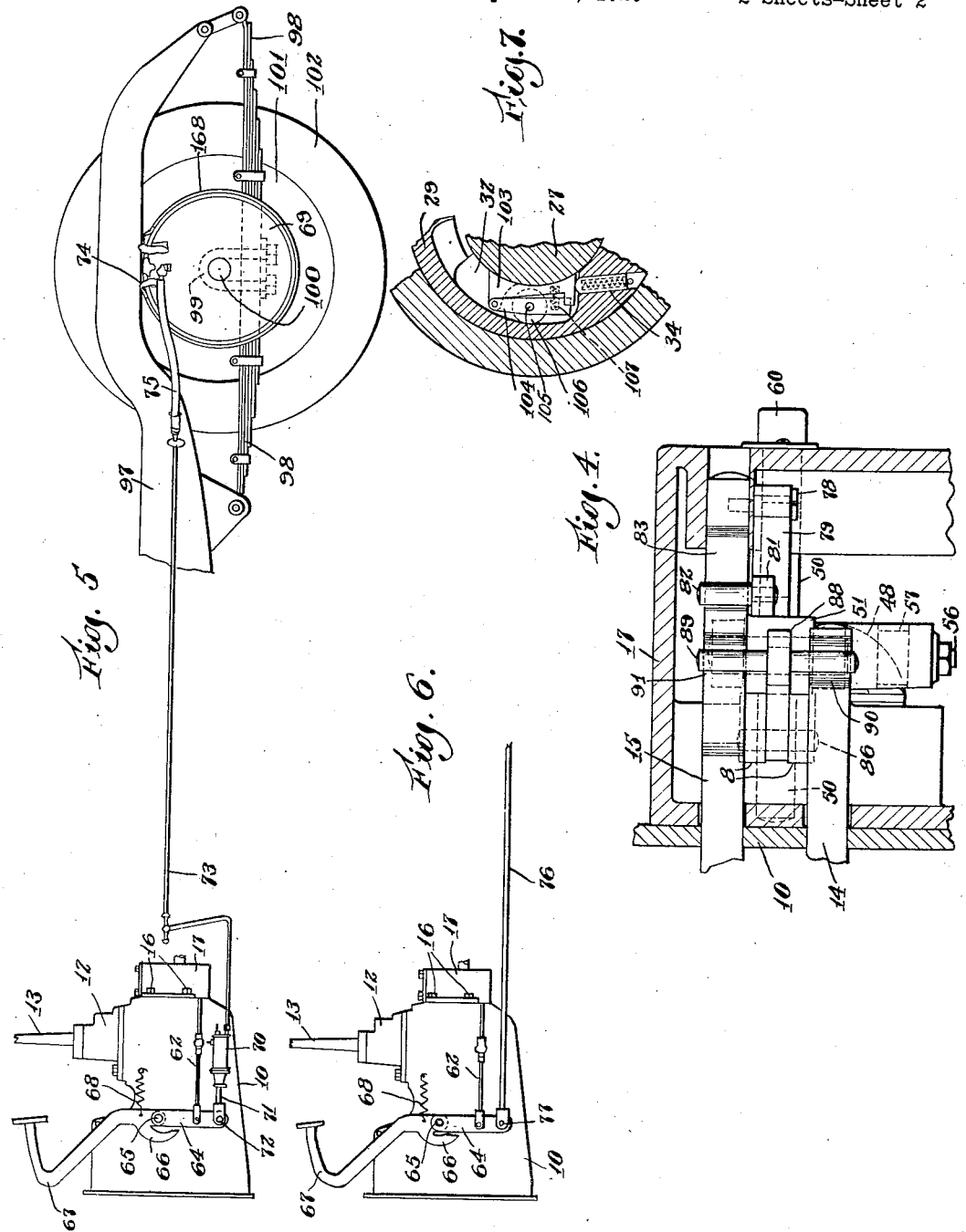
Inventor
Carl A. Matson
by James R. Hodder
Attorney Patented Oct. 3, 1939

2,175,061

UNITED STATES PATENT OFFICE 2,175,061

NO-ROLL-BACK DEVICE

Carl A. Matson, Lynnfield, Mass., assignor, by mesne assignments, of one-half to John B. Jameson, Concord, N. H.

Application April 13, 1929, Serial No. 354,837

15 Claims. (Cl. 192—4)

My present invention relates to braking mechanisms and more particularly to an improved automatic reverse brake or clutch mechanism for automobiles or other mechanical devices.

In the use of the present day automobiles, a dangerous condition frequently arises when it is necessary to stop the vehicle on an incline. In such situation the usual brakes may be applied and will prevent the vehicle from rolling backward. A difficulty, however, arises when it is necessary to start the vehicle in motion after it has been stopped on an incline and this difficulty becomes all the more serious if the vehicle has been stopped on an incline where there is considerable traffic in close proximity and to the rear. If the driver of the automotive vehicle releases the foot brake to accelerate the engine prior to letting in the clutch, the vehicle will invariably roll back and a possible accident through collision with other cars may occur.

In my prior development of this art I have devised means for preventing unauthorized rearward movement of the vehicle by means of a mechanism applied to the propeller shaft or an extension of such propeller shaft, and such devices have proved very efficient in practice. Under some conditions, however, it may be desirable to avoid the use of any braking mechanism on the propeller shaft or extension thereof, and in working out a mechanism whereby such unauthorized rearward movement may be prevented, I have devised the subject matter of the present invention. In carrying out this invention, I have associated with the usual clutching mechanism an automatic device which will automatically operate the usual braking mechanism of the vehicle whether such braking mechanism is the usual mechanical brake or a pneumatic or hydraulic brake, the present invention working equally well with either form of braking device. I associate with the transmission gearing an automatically operable device which will set the braking mechanism on the car under such conditions as to prevent unauthorized rearward movement of the vehicle and yet which may be placed in such condition as to allow a rearward movement of the vehicle when such is desired.

The object of my invention, therefore, is an improved reverse brake or clutch mechanism for automobiles or the like.

In the accompanying drawings illustrating a preferred embodiment of my invention, Fig. 1 is a sectional side elevation;

Fig. 2 is an end elevation on the line 2—2 of Fig. 1;

Fig. 3 is a section on the line 3—3 of Fig. 1;

Fig. 4 is a section on the line 4—4 of Fig. 1;

Fig. 5 is a diagrammatic layout showing the invention as applied to an hydraulic braking system for a motor vehicle;

Fig. 6 is a diagrammatic layout of the device applied to a mechanical brake system, and Fig. 7 is a fragmentary section showing a modified form of locking roll and carrier therefor.

Referring to the drawings, 10 designates a transmission case provided with the usual transmission gearing and having rotatably mounted therein and extending through the rear thereof a transmission shaft 11. Mounted on the top of the transmission casing is a cover 12 in which is pivotally mounted a control lever 13 for operating the slide rods 14 and 15 associated with the change gearing within the casing 10. Attached to the rear of the casing 10 by bolts 16 is a casing 17 provided with an opening 18 at its rear end, such opening being normally closed by a cover plate 19 held in position by screws 20. The casing 17 has a top lever plate 21 secured thereto by bolts 22, removal of the plate 21 permitting access to the interior of the casing 17. The cover plate 19 is perforated to allow the end of the propeller or auxiliary shaft 39 to extend therethrough, such propeller or auxiliary shaft being connected to the splined end of the transmission shaft by flanges 40. Secured to the rear face of the cover plate 19 in any convenient manner, as by bolts 23, is a housing 24, between which and the rear face of the plate 19, is held packing material 25 which prevents oil or other matter working from the interior of the casing 17 outwardly along the shaft 11. A portion of the transmission shaft 11 is splined, as indicated at 26, and on this splined portion is slidably mounted an abutment 27. The rear face of the front wall of the casing 17 is recessed, as indicated at 28, and in this recessed portion is rotatably mounted an annular member 29. The internal diameter of the annular member 29 is greater than the external diameter of the abutment 27, as clearly indicated in Fig. 3, and the outer diameter is such as to allow the member 29 to be a free rotating fit in the recess 28. The width of the member 29 is substantially that of the abutment 27 and on each face of the member 29 are secured by screws 30 circular plates 31, such circular plates also enclosing a portion of the abutment 27, as clearly shown in Fig. 1. The abutment 27 and the annular member 29, therefore, form a unit. Formed in the interior of the annular member 29 is a cut-away portion 32 of any suitable length and this cut-away portion forms, with the periphery of the abutment 27, a tapered chamber in which is mounted a locking roll 33. This roll 33 is, therefore, completely enclosed in a housing or chamber formed of the members 27, 29 and 31. The member 29 adjacent the larger end of the chamber above referred to is provided with a spring pressed plunger 34 which normally bears against the locking roll 33 and tends to force the same into the smaller end of the tapered chamber above referred to, as clearly shown in Fig. 3. A coiled spring 41 is located in the bottom of the recess 28 and has one end, 42, fitting into a recess in the annular member 29, and the other end, 43, fitting into a recess in the casing 17. The spring 41 resiliently holds the annular member 29 in the position shown in Fig. 3 and will rotate such annular member 29 back into such position after being rotated by any means and released. Cut in the annular member 29 is an arcuate slot 44, the angular dimensions of such slot being slightly less than 180 degrees, as will be clearly seen from an inspection of Fig. 3. Screwed into and through a boss 45 formed integrally with the casing 17 is a bolt 46, the inner end 47 of which is cylindrical and has a sliding fit in the arcuate slot 44 above referred to. This cylindrical portion 47 acts as a stop to prevent further counterclockwise rotation of the annular member 29 and acts as a throw-out for the locking roll 33 when the annular member 29 rotates in a clockwise direction. The angular rotation of the annular member 29 is limited by the dimensions of a cam 48, which is formed integrally with and on one face of the annular member 29, as clearly shown in Figs. 1 and 2 and the function of such cam will be hereinafter described.

Lying parallel with but beneath the operating members 14 and 15 of the transmission gearing and in the body of the casing 17 are alined bearings 49 and in such bearings is slidably mounted a shaft 50. Secured to the shaft 50 intermediate its ends is a boss or enlargement 51 through which passes a shaft 52 that extends at right angles to the shaft 50, and on either side of the boss 51. On the shaft 52 are rotatably mounted the forked ends 53 of a curved lever 54, which extends downwardly and carrying at its lower end a shaft 55. Intermediate the ends of the lever 54 is secured a shaft 56 on which is rotatably mounted a cam roller 57 and which cam roller engages with the cam 48 above referred to as being formed integrally with the annular member 29 and on one face thereof. The rear end of the shaft 50 is drilled as indicated at 58 to receive one end of a coiled spring 59, and the other end of this coiled spring is engaged by a cover plate 60 secured to the open end of the bearing 49 by screws 61. The coiled spring 59 urges the shaft 50 and attached parts forwardly or to the left, as viewed in Fig. 1. Pivotally attached to the shaft 55 at the lower end of the lever 54 is the rear end of a connecting rod 62 that passes through a stuffing box 63 in the forward face of the casing 17 and has its front end pivotally attached to a lever 64, that in turn is pivotally attached at one end to a shaft 65 carried on the side of the transmission casing 10 or in any other suitable position on the motor vehicle. This lever 64 forms part of the brake operating mechanism of the motor vehicle and is adapted to be operated by a hooked portion 66 formed integrally with and at the lower end of the brake foot lever 67. The normal position of the foot brake lever 67 is shown in Figs. 5 and 6 and, after operation, the foot brake lever 57 is moved back into its normal position by means of a spring 68. When the foot brake lever 67 is operated it is rotated on the shaft 65 in a counter-clockwise direction and causes a corresponding rotary movement of the lever 64 on the shaft 65 and, therefore a rearward, though idle, movement of the connecting rod 62 to thereby rotate the lever 54 on the shaft 52. In Fig. 5 I have shown a diagrammatic representation of a hydraulic brake system applied to a motor vehicle, such motor vehicle being sufficiently indicated by the framework 97 supported by a rear spring 98 that in turn is suspended by spring supports 99 from a rear axle housing and in such rear axle housing is rotatably mounted a rear axle 100 on which is mounted the usual rear drive wheel 101 having a tire 102 thereon. Referring to Fig. 5 there is shown a brake mechanism 168 on a rear wheel brake drum 69, such brake mechanism comprising the hydraulic pressure generating system consisting of a cylinder 70 and a plunger or piston 71 pivotally attached at 72 to the lower end of the lever 64. Connecting with the pressure cylinder 70 is a conduit 73 through which the pressure is guided to the braking mechanism 74 through the flexible conduit 75. In Fig. 6 I have shown a diagrammatic layout of the usual mechanical brake device consisting of a brake rod 76 pivotally connected at 77 to the lower end of the link 64 and this mechanical brake mechanism is operated in the same manner as is the hydraulic brake mechanism referred to in Fig. 5. That is, rotary movement of the foot brake lever 67 in a counter-clockwise direction moves the brake rod 76 rearwardly, as viewed in such Fig. 6 to set the brakes in the usual manner and also, and simultaneously therewith, moving the connecting rod 62 rearwardly in, however, an idle movement so as to rotate the lever 54 about the shaft 52.

Both of the braking systems shown in such Figs. 5 and 6 may be operated by means of the mechanism shown in Figs. 1, 2 and 3, that is, assuming that the normal direction of rotation of the transmission shaft 11 is counter-clockwise as viewed in Figs. 2 and 3, so as to cause a forward movement of the motor vehicle to which the device is presumed to be attached, it will be obvious from an inspection of either Fig. 2 or 3 that such rotary movement of the transmission shaft 11 will have no effect on the locking roll 33 or on the annular member 29, and such annular member 29 is prevented from rotation in a counter-clockwise direction by the engagement of the cylindrical portion 47 of the bolt 46 with the end of the arcuate slot 44 in such annular member. If, however, the transmission shaft 11 starts to rotate in a clockwise direction, the locking roll 33, assisted by the spring pressed plunger 34, will move into the narrowest part of the chamber in which the locking roll 33 is located, and such locking roll engaging simultaneously with the abutment 27 and the annular member 29, such annular member 29 will rotate in a clockwise direction, thus rotating the cam 48, which cam, in turn, pressing on the roller 57 will rotate the lever 54 on the shaft 52 in a counter-clockwise direction, as viewed in Fig. 1, thus bringing the connecting rod 62 rearwardly, and in the case of Fig. 5, generating pressure in the hydraulic pressure cylinder 70 so as to operate the brake operating means 74, and in the case of the mechanism shown in Fig. 6, moving the brake rods 76 rearwardly, in either case setting the brakes of the motor vehicle and stopping the vehicle. If the braking mechanism becomes worn or does not function, or if any other condition arises so that the annular member 29 rotates too far, the locking roll 33 will engage with the cylindrical member 47 and further rotary movement of the annular member 29 will throw the locking roll 33 into the larger part of the chamber formed by the abutment 27 and the annular member 29, whereupon the spring 41 will tend to rotate such annular member 29 in a counter-clockwise direction (Fig. 3) and prevent further rotation thereof in a crosswise direction. Also, assuming that the braking mechanism is functioning properly, and has brought the vehicle to rest, a forward movement of such vehicle will permit the spring 41 to return the annular member 29 to its original or initial position, as shown in Fig. 3. The brake mechanism, therefore, above described will prevent rearward movement of the vehicle to which the device is attached by setting the brakes of such vehicle and as such brakes are set automatically, the driver of the vehicle need pay no attention to the braking mechanism when bringing the car to rest, for example on an incline, as rearward movement is prevented in the manner above described.

As it is necessary in some circumstances to allow the vehicle to which the device is attached to move rearwardly, I have provided means for placing the mechanism above described out of action temporarily and at will so as to allow such rearward movement. Also, it is desirable and sometimes necessary to place such braking mechanism out of action so as to allow the vehicle to which the same is attached to be moved forwardly or backwardly by hand, as in the case where it is desired to push the car about in a garage or other place. Fig. 1 illustrates the braking mechanism in the normal or operative position and to maintain such mechanism in normal position I have provided a shaft 78 on which is mounted a forwardly extending member 79. Attached to the forward end of the member 79 is a downwardly extending portion 80 which engages behind the block 51 and holds the same in engagement with the rear end of the bearing 49. The fulcrum shaft 52 is, therefore, under these conditions held fixed and any movement to the left of the lower end of the lever 54 will be about a practically fixed shaft. Extending upwardly from the member 79 is a projection 81 provided on its upper end with a laterally extending rod 82 that is adapted to be engaged by the ends of a cam groove 83 formed in the slide rod 15, which is the rod that operates the reverse gearing within the casing 10. In all of the forward speeds of the transmission gearing, however, the laterally extending rod 82 will ride in the groove 83 of such rod 15 and the member 79 will remain in the position shown in Fig. 1. When, however, the lever 13 is operated to place the transmission gearing in reverse, the operating rod 15 moves rearwardly or to the right, as shown in Fig. 1, whereupon the cam at the end of the groove 83 will force the rod 82 upwardly, thus rotating the member 79 about the shaft 78 and moving the projection 80 upwardly out of engagement with the block 51. Under these conditions, however, the coiled spring 59 is sufficiently strong to keep the shaft 52 resiliently in the position shown in Fig. 1. If the transmission shaft 11 is now rotated in a clockwise direction, the cam 48 will likewise rotate because of the connection of the abutment 27 and the annular member 29 by the locking roll 33 but rotary movement of the cam will merely force the roll 57 to the right, as viewed in Fig. 1, and the block 51 will move to the right, as shown in such figure, against the tension of the spring 59 a sufficient distance to allow the projection 84 on the member 85, that in turn is rotatably mounted on a shaft 86 in lugs 87 on the casing 17 to drop in front of the block 51 and thus lock the block 51 and, therefore, the lever 54 out of operative position with respect to the cam 48. Formed integrally with the member 85 and extending upwardly therefrom is a member 88 and secured to such member 88 adjacent its top end and extending laterally outward from each side thereof is a rod 89 adapted to engage in cam grooves 90 and 91 in the operating rods 14 and 15 respectively. Under the conditions assumed, that is with the sliding rod 15 in its rearmost position, or in neutral, the cam grooves 90 and 91 are in alinement with the rod 89, and such rod 89 will, therefore, drop into such cam grooves 90 and 91 as soon as the block 51 moves rearwardly or to the right, as viewed in Fig. 1, when the transmission shaft 11 rotates in a clockwise direction, and will remain in such grooves after the operating rod 15 has moved the transmission gearing out of reverse position and into neutral. Under such conditions the vehicle to which the device is attached may be moved backwardly or forwardly by hand, as under these circumstances, the locking roll 33 cannot operate to apply the brake. When however the lever 13 is operated to move the transmission gearing into any forward speed, the cam surfaces at the ends of the cam slots 90 and 91 will engage with the laterally extending member 89 to rotate the member 85 in a counterclockwise direction so as to lift the downwardly projecting portion 84 thereof out from in front of the block 51, whereupon the spring 59 will urge the shaft 50 forwardly, carrying the block 51 therewith and when in its most forward position, the member 79 will rotate in a counter clockwise direction, bringing the portion 80 thereof into position behind the block 51 or into the position shown in Fig. 1. It will be understood that sufficient loose play is present between the block 51 and projections 80 and 84 to permit movements of said projections into engaging and disengaging positions relative to the block 51.

Referring to Fig. 7 there is shown the abutment 27 surrounded by the annular member 29, in which is formed the cutaway portion 32 that forms, with the abutment 27, a tapered chamber and at the larger end of which is located the spring pressed plunger 34. Within the chamber 32 is a brake shoe 103 which is normally in engagement with the abutment 27 and is engaged at its rear or lower end, as indicated in Fig. 7, by the spring pressed plunger 34. Pivotally mounted at one end of the brake shoe 103 is an auxiliary frame 104 in which is rotatably mounted on a shaft 105 a locking roll 106, similar in all respects to the locking roll 33. The free end of the auxiliary frame 104 is resiliently held outwardly from the brake shoe 103 by a coil spring 107 and the manner in which this spring operates is obvious from an inspection of Fig. 7. Normally the locking roll 106 is out of engagement with the abutment 27 and only comes into engagement therewith when a locking action between the abutment 27 and annular member 29 and locking roll 106 is desired. The brake shoe 103 is cut away so as to allow the locking roll 106 to extend therethrough and into engagement with the abutment 27. Assuming that the parts are in normal position and that it is attempted to rotate the transmission shaft and, therefore, the abutment 27 in a clockwise direction, as viewed in Fig. 7, the friction existing between the abutment 27 and the brake shoe 103, assisted by the spring pressed plunger 34, will move the brake shoe 103 forwardly, as viewed in Fig. 7, or into the smaller end of the tapered chamber 32. Under these conditions the locking roll 106 will be forced to the right, as viewed in such Fig. 7, into engagement with the abutment 27. This form of my invention is extremely desirable as there is no appreciable wear on the locking roll, the same being out of engagement of the abutment 27 except when a locking engagement is desired.

While I have necessarily described the preferred embodiments of my invention somewhat in detail, it is to be understood that I may vary the size, shape, and arrangement of parts within wide limits without departing from the spirit of the invention.

Having thus described my invention, what I claim as new is:

1. In an automotive vehicle having a power shaft, the combination with the braking devices for a motor vehicle, of operating means therefor controlled by the power shaft of the vehicle, and automatically actuated means for locking the operating means in operative position.

2. In an automotive vehicle having a power shaft, the combination with the normal wheel brakes of a motor vehicle, of operating means therefor automatically controlled by the power shaft of the vehicle, and means for locking the operating means in inoperative position.

3. In an automotive vehicle having a power shaft, the combination with the braking devices for a motor vehicle, of operating means therefor controlled by the power shaft of the vehicle, and means for locking the operating means in operative or inoperative position at will.

4. In an automotive vehicle having a power shaft, the combination with the braking devices for a motor vehicle, of operating means therefor controlled by the power shaft of the vehicle, and automatically actuated means, including a pivoted lever for locking the operating means in operative or inoperative position at will.

5. In an automotive vehicle having a power shaft, the combination with the braking devices for a motor vehicle, of operating means therefor controlled by the power shaft of the vehicle, and means, including a lever, a movable fulcrum for said lever, and means for locking, the fulcrum of the lever in any of a plurality of positions to place the operating means in operative or inoperative position at will.

6. In an automotive vehicle having a power shaft, the combination with the normal wheel brakes of a motor vehicle, of a power shaft, controlling means for the brakes, including a movable member, and means automatically operated by the power shaft in its rotation in one direction and independently of any external actuating devices for moving the movable member to set the brakes.

7. In an automotive vehicle having a power shaft, the combination with the normal wheel brakes of a motor vehicle, of a power shaft, controlling means for the brakes, including a movable member, and means operating by the power shaft in its rotation in one direction and independently of any external actuating devices, for moving the movable member to set the brakes.

8. The combination with a braking device for the wheels of a motor vehicle, of a transmission gearing casing, operating mechanism for the gearing in said casing, an auxiliary casing attached to the first said casing, controlling means for the braking device contained in said auxiliary casing, connections between the controlling means and the braking device, and means interposed between the operating mechanism for the transmission gearing and the controlling means for the braking device for automatically operating the braking device.

9. The combination with a braking device for the wheels of a motor vehicle, of a casing, a power transmission shaft in said casing, a member rotatable with said shaft, a member surrounding said first member and adapted to be automatically rotated therewith on rotation of said transmission shaft in one direction, a lever pivotally mounted in said casing, a rod connected at one end to said lever and at its other end to the braking device, a cam on said surrounding member, and a member on said lever adapted to be engaged by said cam on rotation of said surrounding member in one direction to actuate said rod.

10. The combination with a braking device for the wheels of a motor vehicle, of a casing, a power transmission shaft in said casing, a member rotatable with said shaft, a member surrounding said first member and adapted to be automatically rotated therewith on rotation of said transmission shaft in one direction, a lever pivotally mounted in said casing, a rod connected at one end to said lever and at its other end to the braking device, a cam on said surrounding member, a member on said lever adapted to be engaged by said cam on rotation of said surrounding member in one direction to actuate said rod, and means to normally maintain said lever in inoperative position.

11. The combination with a braking device for the wheels of a motor vehicle, of a casing, a power transmission shaft in said casing, a member rotatable with said shaft, a member surrounding said first member and adapted to be automatically rotated therewith on rotation of said transmission shaft in one direction, a lever pivotally mounted in said casing, a rod connected at one end to said lever and at its other end to the braking device, a cam on said surrounding member, a member on said lever adapted to be engaged by said cam on rotation of said surrounding member in one direction to actuate said rod, and means to prevent operation of said lever on rotation of said shaft in the opposite direction.

12. The combination with a braking device for the wheels of a motor vehicle, of a casing, a power transmission shaft in said casing, a member rotatable with said shaft, a member surrounding said first member and adapted to be automatically rotated therewith on rotation of said transmission shaft in one direction, a lever pivotally mounted in said casing, a rod connected at one end to said lever and at its other end to the braking device, a cam on said surrounding member, a member on said lever adapted to be engaged by said cam on rotation of said surrounding member in one direction to actuate said rod, means to prevent operation of said lever on rotation of said shaft in the opposite direction, and means to release said last means to permit actuation of said lever.

13. In combination with an automotive vehicle having wheels and an internal combustion engine, a drive shaft, transmission gearing including a reverse gear adapted to couple said engine and drive shaft, brakes, a brake actuating arm, a one-way clutch connection between said arm and drive shaft operable on reverse rotation of the latter to apply the brakes, and means operable in coupling said reverse gear and shaft for rendering said clutch inoperative.

14. In an automobile, the combination of brakes, a transmission having forward, neutral, and reverse speed positions, means for automatically applying the brakes upon rearward movement of the automobile, and additional means adapted to render inoperative said first means when said transmission is in reverse position or in neutral position following reverse.

15. In an automobile having a drive shaft and equipped with brakes and a means for manually applying said brakes, to stop the automobile, the combination of means for automatically applying said brakes upon unauthorized rearward movement of the automobile, means acting upon authorizing rearward movement of the automobile to prevent functioning of said means for automatically applying the brakes, and means adapted to restore to operation said means for automatically applying the brakes, after a reverse rotation of said drive shaft has occurred, only after forward rotation of said drive shaft.

CARL A. MATSON.